United States Patent [19]
Walden

[11] 4,365,420
[45] Dec. 28, 1982

[54] CHAIN GAUGE

[76] Inventor: William C. Walden, Box F, Sandstone, Minn. 55072

[21] Appl. No.: 248,420

[22] Filed: Mar. 27, 1981

[51] Int. Cl.³ .................. B23D 63/00; G01B 5/20
[52] U.S. Cl. ............................. 33/202; 33/143 R
[58] Field of Search ............... 33/202, 143 R, 143 M

[56] References Cited

U.S. PATENT DOCUMENTS

| | | | |
|---|---|---|---|
| 2,612,702 | 10/1952 | Pearce | 33/202 |
| 3,391,462 | 7/1968 | Craine | 33/143 M |
| 3,845,559 | 11/1974 | Offer | 33/143 M |
| 3,965,580 | 6/1976 | Bogart et al. | 33/143 M |

Primary Examiner—Willis Little

[57] ABSTRACT

Apparatus is disclosed for measuring characteristics of chains, preferably of the type utilized on chain saws, having a semicircular holder affixed at the end of an elongated scale and a semicircular shoe slidable along the scale, the scale having graduations indicative of the number of chain links and the apparatus having sight holes for measuring chain link pitch and gauge.

14 Claims, 4 Drawing Figures

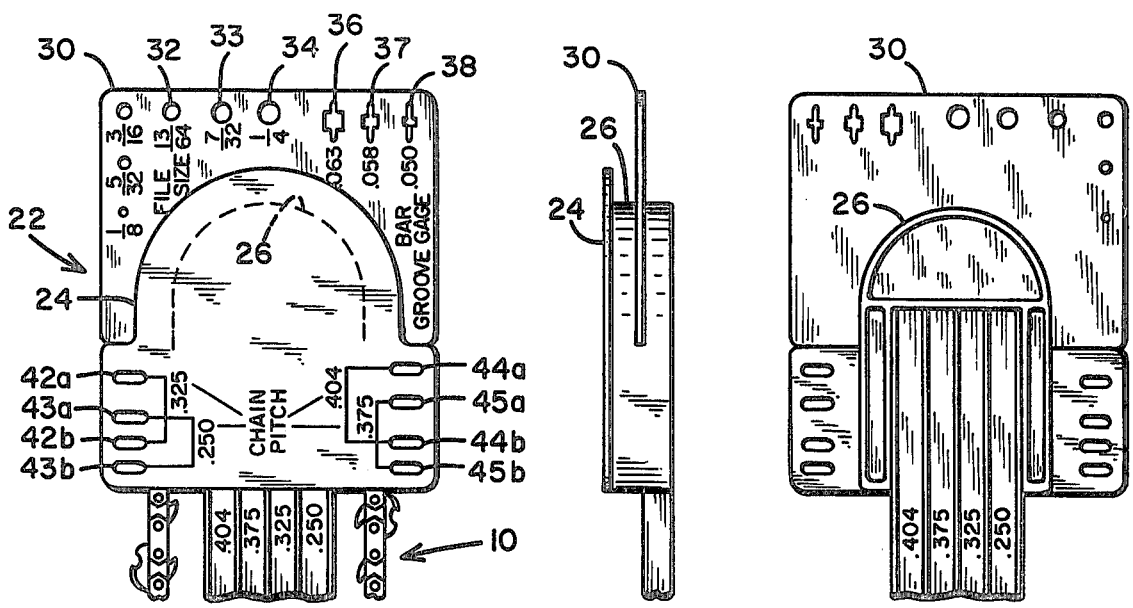
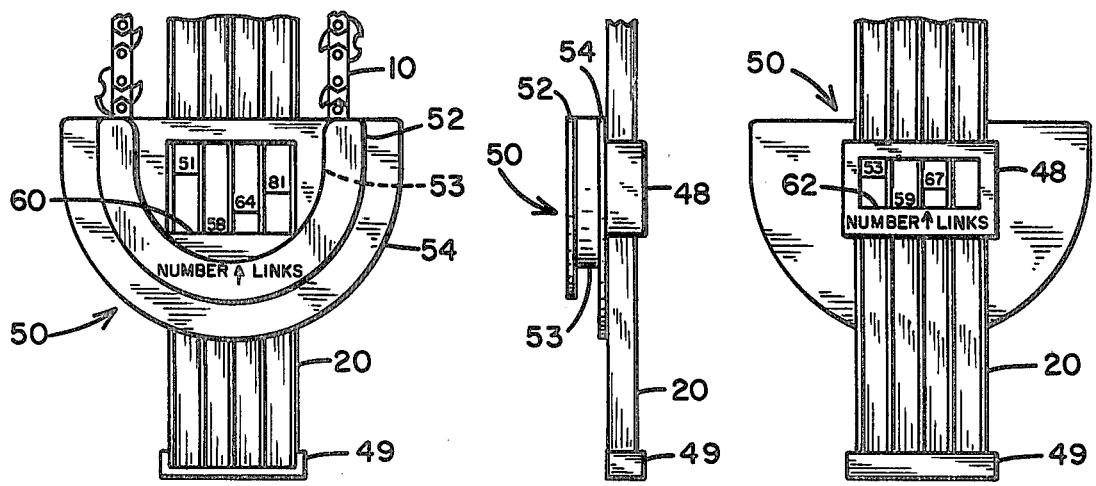
Fig. 1   Fig. 2   Fig. 3
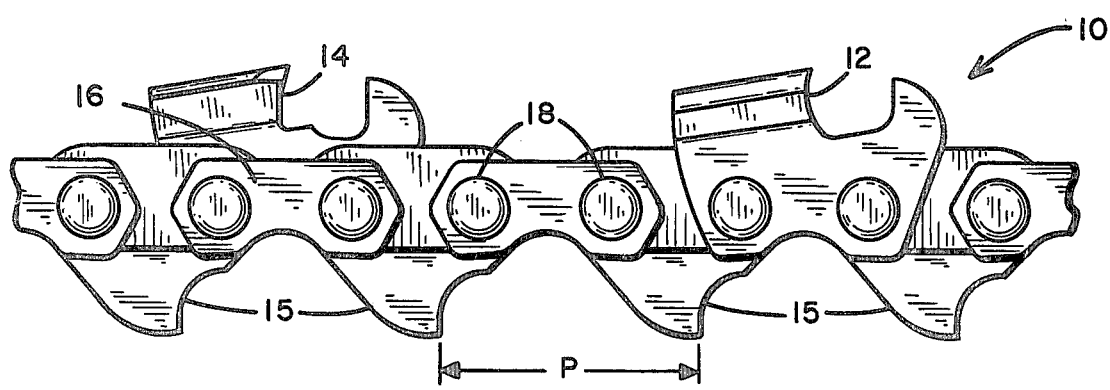
Fig. 4

CHAIN GAUGE

BACKGROUND OF THE INVENTION

This invention relates to an apparatus for measuring certain characteristics of chains, and more particularly to an apparatus for measuring such characteristics of chains commonly used in chain saws.

A particular problem in the maintenance, repair and replacement of chains, particularly of the type utilized in chain saws, is making a proper determination of the physical characteristics of the chain in order that maintenance, repair and replacement may be accomplished. For example, when replacing a particular chain from a chain saw it is necessary to know exactly the number of links which the chain to be replaced has in order that a proper fit of the chain on the chain saw may be accomplished. Heretofore it has been customary to count the number of links by a manual count, usually by marking a starting link and manually counting each link around the chain loop. This method lends itself to inaccuracies, as it is easy to miss a link count or count a link twice. If such an error is made, and a replacement chain is constructed with one or more missing links or additional links, the replacement chain is useless for the purpose intended. Another technique which has been used in attempting to measure the overall length of a chain loop is to lay it on a flat surface and extend it into an elongated form and measure the length from end to end. This technique also leads to inaccuracies, as it is dependent upon the degree of loop elongation while making the measurement, and requires that the loop shape be identical both in the chain to be replaced and in the new chain to be constructed.

Chains are frequently replaced by a dealer who purchases chain in bulk lengths wound around spools. This replacement chain may be withdrawn from the spool to any selected length, and then assembled into a new chain look for replacement purposes. For the reasons described above, it is important that a replacement chain have precisely the same number of links as the chain to be replaced.

In the case of chains in general, and particularly in the case of chains utilized on chain saws, repair, maintenance and replacement is made more difficult by the fact that such chains are available in a number of different link sizes. The size of a chain link is typically referred to as the chain pitch, and chain pitch is commercially available in up to six different link dimensions. The foremost common chain pitches are 0.250 inches, 0.325 inches, 0.375 inches, and 0.404 inches. Since these chain pitch sizes are relatively similar in size dimensions, it is difficult to ascertain with the naked eye precisely which of the several chain pitches one is observing in a particular case. Measurement with a ruler or other linear scale is possible, but even this measurement must be done precisely in order to ascertain the relatively close dimensional tolerances which exist between the various chain pitches.

SUMMARY OF THE INVENTION

The present invention comprises a chain gauge having a holder for accepting a chain loop, one end of the holder being slidable over a linear scale so that the chain loop may be distended to its maximum length. The slidable holder portion comprises a slidable shoe having a cursor thereon, which enables the operator to read a graduation on the linear scale to determine the number of links on the chain. Further, the holder has a plurality of pairs of sight holes aligned so as to view the chain links, and by alignment with the sight holes the pitch of the chain links may be determined.

Accordingly it is an object of the present invention to provide a chain gauge for measuring certain physical characterstics of chains.

It is another object of the invention to provide a chain gauge having a fixed and movable holder section, operable in conjunction with a scale, to enable a measurement of the number of links on a chain.

It is yet another object of the invention to provide a chain gauge having means for measuring the chain link pitch.

It is a further object of the invention to provide a chain gauge having additional calibrated apertures for measuring various chain characteristics.

BRIEF DESCRIPTION OF THE DRAWINGS

The foregoing and objects may be ascertained from the appended specification, and with reference to the drawings, in which FIG. 1 shows a front elevation view of the invention; and FIG. 2 shows a side elevation view of the invention; and FIG. 3 shows a rear view of the invention; and FIG. 4 shows a segment of a saw chain.

DESCRIPTION OF THE PREFERRED EMBODIMENT

Referring first to FIG. 4, the pertinent elments of a typical saw chain will be described. A saw chain is comprised of a plurality of links of several different nomenclatures. For example, saw chain 10 has a right hand cutter link 12 and a left hand cutter link 14. The cutter links are respectively connected to drive links 15, and coupler links 16 are used for the remaining link interconnections. All of the links are held together by rivets 18.

The "chain pitch" is determined by measuring the distance P between adjacent drive links 15. The "gauge" of the chain is determined by measuring the thickness of a drive link 15. Typically, chain gauges may be found in dimensions of 0.050, 0.58, and 0.063 inches.

If chain 10 is subjected to severe usage wear occurs between the respective moving parts. Typically, the rivets 18 and/or the holes through which the rivets pass are subjected to wear, and the overall effect of this cumulative wear is a slight expansion in the overall length of the chain. For severely worn chains, the cumulative wear may extend the overall chain length by the equivalent one extra link. Thus, when measuring the length of a chain consideration must be given to the degree of wear of the chain in order that the precise number of links may be ascertained. The length of a chain is typically measured in terms of the number of drive links 15 which the chain has, and a severely worn chain may be elongated to nearly the extent of an additional drive link.

Referring next to FIG. 1, the invention is shown in front elevation view. A scale 20 having one or more parallel lines of graduations thereon is affixed into a holder 22. Holder 22 has a semicircular face plate 24 covering a curved surface 26, face plate 24 being sized so as to construct a protruding lip beyond the edge of surface 26. A hanger bracket and gauge 30 is affixed to surface 26 and projects vertically therefrom.

Hanger bracket and gauge 30 may have additional calibrated apertures therethrough, as for example 32, 33, 34 of different predetermined diameters for serving as a file gauge. Hanger bracket 30 may also have apertures such as apertures 36, 37, 38, which may be made of predetermined size to serve as gauges for measuring the thickness of drive link 15.

Faceplate 24 has a plurality of pairs of sight holes, as for example sight holes 42a, 42b, which are elongated holes arranged in a predetermined and precise spacing relationship. For example, sight holes, 43a, 43b may be spaced at a 0.250 inch spacing, sight holes 42a, 42b may be spaced at a 0.325 inch spacing, sight holes 44a, 44b may be spaced at a 0.404 inch spacing; sight holes 45a, 45b may be spaced at a 0.375 inch spacing. The respective pairs of sight holes are spaced to coincide with the chain pitches of commercially available chains, and one or more pairs of such holes may be positioned along faceplate 24. Alternatively, these holes may be positioned along upper lip 52 of slidable shoe 50.

A slidable shoe 50 is fitted around scale 20 to permit sliding motion of shoe 50 along scale 20. Shoe 50 has an upper lip 52 formed around a curved radius and a lower lip 54 similarly formed around a curved radius. Lips 52 and 54 project from a curved surface 53 to form a channel therebetween along surface 53. Shoe 50 has an opening 58 therethrough to expose a portion of scale 20, and a cursor line 60 may be utilized to read scale 20 as will be hereinafter described.

FIG. 1 shows a chain 10 mounted in position for use of the invention. Chain 10 is looped around curved surface 26 at its upper end, and is distended at its lower end while being held along curved surface 53 by means of upper lip 52 and lower lip 54 of shoe 50.

FIG. 2 shows a side elevational view of the invention, eliminating chain 10 for clarify. The spacing of hanger bracket 30 relative to faceplace 24 provides a channel over curved surface 26 for containing chain 10. Similarly, the spacing of upper lip 52 relative to lower lip 54 on shoe 50 provides a channel over curved surface 53 for containing chain 10. Shoe 50 has a guide member 48 which extends around scale 20 in a relatively loose fit, to permit shoe 50 to be slidable along scale 20. A stop 49 is attached at the end of scale 20 to prevent shoe 50 from sliding off the end of scale 20.

FIG. 3 shows the invention in rear elevation view. The rear side of scale 20 may also contain graduations along the length of the scale to permit additional calibrations of the parameters to be measured on a typical chain. Guide 48 has an opening 59 bridging scale 20, and a cursor line 62 may be utilized to obtain an accurate reading along the graduations on the reverse side of scale 20.

The respective elements of the invention may be constructed from molded plastic to thereby provide a gauge at a relatively inexpensive cost. As is apparent from the drawings, scale 20 may be made of any convenient length to accommodate chains of varying sizes. In the preferred embodiment scale 20 is in excess of 36 inches long to measure chains having over 80 links. Further, the front and reverse sides of scale 20 may be segmented into parallel series of graduations, each series of graduations corresponding to different chain pitches. In this manner, the device may be useful for a wide range of different types of chains. Further, the reverse side of scale 20 may be calibrated with one or more lines of graduations corresponding to the chain pitch graduations on the front side of scale 20, but offset by a predetermined amount to compensate for the measurement of severely worn chains. For example, the graduations along the reverse side of scale 20 may be offset by one chain link increment from the graduations on the front side of scale 20. In this manner, if it is apparent that one is measuring an extremely worn chain, the number of links may be more accurately determined from a reading taken on the reverse side of scale 20.

In operation, a chain is looped over the curved surface in holder 22 and is distended downwardly. Shoe 50 is slidable along scale 20 until it accepts the lower loop of the chain, and is further distended until the chain is tightly contained between shoe 50 and holder 22. Next, the chain is longitudinally moved while viewing the chain through the sight holes 42a, b through 45a,b until adjacent drive links are observed through a pair of the sight holes. These drive links are shifted until an ajdacent pair of drive links appears in a particular pair of sight holes, and the pitch P is derived from the spacing of the particular sight holes wherein adjacent drive links are seen. For convenience, the respective pairs of sight holes may be labeled with the respective chain pitches they represent. Once the pitch of the chain is known, the number of links in that chain may be determined by observing the cursor line 60 and reading scale 20 along the particular line of graduations corresponding to the chain pitch P observed in the sight holes. Having thus determined the chain pitch and the number of links in the chain, it is a relatively simple matter to select the proper replacement chain as well as the proper length of that chain for replacement purposes.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for measuring link characteristics of chains including number of chain links as a function of pitch of chain links, comprising
    (a) a semicircular holder having a recess therein for accepting a chain, said holder having a plurality of pairs of sight holes, each such pair of sight holes positioned along said recess to permit viewing of said chain links;
    (b) an elongated scale extending from said semicircular holder, said scale having graduations thereon indicative of the number of links on a chain;
    (c) a semicircular shoe slidably mounted on said elongated scale, said shoe having a recess therein for accepting a chain and having a cursor thereon for reading graduations on said scale.

2. The apparatus of claim 1, wherein each of said pairs of sight holes is positioned with a predetermined spacing corresponding to a chain link spacing.

3. The apparatus of claim 2, wherein said scale further comprises a line of graduations corresponding to each of said pairs of sight holes.

4. The apparatus of claim 3, wherein the number of lines of graduations on said scale and the number of pairs of sight holes comprise four.

5. The apparatus of claim 3, wherein said scale further comprises a plurality of additional lines of graduations on the reverse side thereof, and said shoe further comprises an additional cursor on the reverse side thereof.

6. The apparatus of claim 5, wherein said semicircular holder further comprises a slotted end opening and said scale is affixed therein.

7. The apparatus of claim 6, wherein said slidable shoe further comprises a member surounding said scale.

8. The apparatus of claim 5, wherein the additional lines of graduations on the reverse side of said scale are respectively offset from corresponding graduations on the front side of said scale by a predetermined distance.

9. The apparatus of claim 8, wherein said semicircular holder further comprises means for measuring the thickness gauge of said chain links.

10. The apparatus of claim 9, further comprising a stop member at the end of said scale.

11. An apparatus for measuring the link pitch and number of links in a chain loop, comprising:
 (a) an elongated scale having a plurality of parallel lines of graduations thereon;
 (b) a holder affixed to one end of said scale, said holder having means for accepting and retaining a chain loop;
 (c) a slidable shoe attached to said scale, said shoe having means for accepting and retaining said chain loop and for distending said chain loop to its maximum length.
 (d) a cursor on said slidable shoe, said cursor positioned to enable the reading of the graduations on said scale; and
 (e) means for measuring the length of one chain link of said chain, said means comprising at least one pair of spaced apart openings in said holder, and being correlated to one or more of said lines of graduations on said scale.

12. The apparatus of claim 11, wherein said scale further comprises a plurality of pairs of parallel lines of graduations on the front and reverse sides thereof.

13. The apparatus of claim 12, wherein said slidable shoe further comprises an additional cursor on the rear side thereof, for reading graduations on the reverse side of said scale.

14. The apparatus of claim 13, wherein said graduations on the reverse side of said scale are offset by a predetermined distance relative to the graduations on the front side thereof.

* * * * *